United States Patent
Galpin et al.

(10) Patent No.: US 11,375,202 B2
(45) Date of Patent: Jun. 28, 2022

(54) TRANSLATIONAL AND AFFINE CANDIDATES IN A UNIFIED LIST

(71) Applicant: InterDigital VC Holdings, Inc., Wilmington, DE (US)

(72) Inventors: Franck Galpin, Thorigne-Fouillard (FR); Tangi Poirier, Thorigne-Fouillard (FR); Ya Chen, Rennes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/277,460

(22) PCT Filed: Sep. 4, 2019

(86) PCT No.: PCT/US2019/049426
§ 371 (c)(1),
(2) Date: Mar. 18, 2021

(87) PCT Pub. No.: WO2020/060757
PCT Pub. Date: Mar. 26, 2020

(65) Prior Publication Data
US 2021/0352294 A1    Nov. 11, 2021

(30) Foreign Application Priority Data
Sep. 21, 2018    (EP) .................................. 18306232

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/159* (2014.11); *H04N 19/176* (2014.11)

(58) Field of Classification Search
CPC .. H04N 19/139; H04N 19/176; H04N 19/159; H04N 19/105
See application file for complete search history.

(56) References Cited

U.S. PATENT DOCUMENTS

| | | | |
|---|---|---|---|
| 2018/0098087 A1 | 4/2018 | Li et al. | |
| 2021/0195234 A1* | 6/2021 | Zhang | H04N 19/52 |

FOREIGN PATENT DOCUMENTS

| | | | | |
|---|---|---|---|---|
| EP | 3291557 A1 | 3/2018 | | |
| WO | WO-2017118409 A1 * | 7/2017 | ........... | H04N 19/109 |

(Continued)

OTHER PUBLICATIONS

Chen et al.,"Description of SDR, HDR and 360 video coding technology proposed by Qualcomm and Technicolor-low and high complexity versions", Joint Video Exploration Team (JVET) of ITU-T SG 16 WP 3 and ISO/IEC JTC 1/SC 29/WG 11, Document: JVET-J0021, 10th Meeting: San Diego, California, USA, Apr. 10, 2018, 43 pages.

(Continued)

*Primary Examiner* — Francis Geroleo
(74) *Attorney, Agent, or Firm* — Condo Roccia Koptiw LLP

(57) ABSTRACT

At least a method and an apparatus are presented for efficiently encoding or decoding video. For example, one or more prediction models are determined respectively for one or more prediction candidates used for the video encoding based on one or more control point motion vectors of a current block of the video being encoded or decoded. It is determined from the one or more control point motion vectors that a first prediction model of the one or more prediction models may be a translational prediction model. It is also determined from the one or more control point motion vectors that a second prediction model of the one or more prediction models is to be an affine prediction model.

(Continued)

The video is encoded or decoded based on a candidate list comprising the one or more prediction candidates determined respectively from the one or more prediction models.

20 Claims, 16 Drawing Sheets

(51) Int. Cl.
    *H04N 19/159*     (2014.01)
    *H04N 19/176*     (2014.01)

(56) References Cited

FOREIGN PATENT DOCUMENTS

| WO | WO-2017118411 A1 * | 7/2017 | ........... H04N 19/176 |
|---|---|---|---|
| WO | WO 2017118411 A1 | 7/2017 | |
| WO | WO 2019002215 A1 | 1/2019 | |
| WO | WO 2019070944 A1 | 4/2019 | |
| WO | WO 2020005572 A1 | 1/2020 | |
| WO | WO 2020056095 A1 | 3/2020 | |

OTHER PUBLICATIONS

Anonymous, "Information Technology—Generic Coding of Moving Pictures and Associated Audio Information: Video", International Organization for Standardization (ISO) and the International Electrotechnical Commission (IEC), International Standard 13818-2. Recommendation ITU-T H.262, Document ISO 13818-2: 1995 (E), 1995, 255 pages.

Anonymous, "Series H: Audiovisual and Multimedia Systems, Infrastructure of audiovisual services—Coding of moving video—Reference software for ITU-T H.265 high efficiency video coding", International Telecommunication Union, ITU-T Telecommunication Standardization Sector of ITU, Recommendation ITU-T H.265. 2, Oct. 2014, 12 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation ITU-T H.222.0, Jul. 1995, 135 pages.

Hsu et al., "Description of SDR Video coding technology proposal by Mediatek", Joint Video Experts Team (JVET) of ITU-T SG 16 WP 3 and ISO/IEC JTC 1/SC 29/WG 11, Document JVET-J0018, 10th Meeting, San Diego, California, USA, Apr. 10, 2018, 64 pages.

Yang et al., "Description of Core Experiment 4 (CE4): Inter prediction and motion vector coding", Joint Video Experts Team (JVET) of ITU-T SG 16 WP 3 and ISO/IEC JTC 1/SC 29/WG 11, Document: JVET-K1024-v3, 11th Meeting Ljubljana, Slovenia, Jul. 10, 2018, 45 pages.

Chen et al, "Algorithm Description of Joint Exploration Test Model 7 (JEM 7)", Joint Video Exploration Team (JVET) of ITU-T SG 16 WP 3 and ISO/EC JTC 1/SC 29/WG 11 N17055, Document: JVET-G1001-V1, 7th Meeting, Torino, Italy, Jul. 13, 2017, 48 pages.

\* cited by examiner

TRANSLATIONAL AND AFFINE CANDIDATES IN A UNIFIED LIST

CROSS REFERENCE TO RELATED APPLICATIONS

This application is the national stage entry under 35 U.S.C. § 371 of International Application PCT/US2019/049426, filed Sep. 4, 2019, which was published in accordance with PCT Article 21(2) on Mar. 26, 2020, in English, and which claims the benefit of European Patent Application No. 18306232.2, filed Sep. 21, 2018.

TECHNICAL FIELD

At least one of the present embodiments generally relates to a method or an apparatus for video encoding or decoding, and more particularly, to a method or an apparatus for efficiently providing a unified list of candidates, including affine candidates and translational (i.e., traditional) candidates, for the video encoding or decoding.

BACKGROUND

To achieve high co-SPECImpression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

A recent addition to high compression technology includes using a motion model based on affine modeling. In particular, affine modeling is used for motion compensation for encoding and decoding of video pictures. In general, affine modeling is a model using at least two parameters such as, e.g., two control point motion vectors (CPMVs) representing the motion at the respective corners of a block of picture, that allows deriving a motion field for the whole block of a picture to simulate, e.g., rotation and homothety (zoom).

SUMMARY

The drawbacks and disadvantages of the prior art are solved and addressed by the general aspects described herein, which are directed to having a unified list of translational and affine motion candidates for the video encoding and decoding.

According to a first aspect, there is provided a method. The method comprises determining one or more prediction models respectively for one or more prediction candidates used for the video encoding based on one or more control point motion vectors of a current block of the video being encoded; determining from the one or more control point motion vectors that a first prediction model of the one or more prediction models is to be a translational prediction model; determining from the one or more control point motion vectors that a second prediction model of the one or more prediction models is to be an affine prediction model; and encoding the video based on a candidate list comprising the one or more prediction candidates determined respectively from the one or more prediction models.

According to another aspect, there is provided a second method. The method comprises determining one or more prediction models respectively for one or more prediction candidates used for the video decoding based on one or more control point motion vectors of a current block of the video being decoded; determining from the one or more control point motion vectors that a first prediction model of the one or more prediction models is to be a translational prediction model; determining from the one or more control point motion vectors that a second prediction model of the one or more prediction models is to be an affine prediction model; and decoding the video based on a candidate list comprising the one or more prediction candidates determined respectively from the one or more prediction models.

According to another aspect, there is provided an apparatus. The apparatus comprises one or more processors, wherein the one or more processors are configured to: determine one or more prediction models respectively for one or more prediction candidates used for the video encoding based on one or more control point motion vectors of a current block of the video being encoded; determine from the one or more control point motion vectors that a first prediction model of the one or more prediction models is to be a translational prediction model; determine from the one or more control point motion vectors that a second prediction model of the one or more prediction models is to be an affine prediction model; and encode the video based on a candidate list comprising the one or more prediction candidates determined respectively from the one or more prediction models.

According to another aspect, there is provided another apparatus. The apparatus comprises one or more processors, wherein the one or more processors are configured to: determine one or more prediction models respectively for one or more prediction candidates used for the video decoding based on one or more control point motion vectors of a current block of the video being decoded; determine from the one or more control point motion vectors that a first prediction model of the one or more prediction models is to be a translational prediction model; determine from the one or more control point motion vectors that a second prediction model of the one or more prediction models is to be an affine prediction model; and decode the video based on a candidate list comprising the one or more prediction candidates determined respectively from the one or more prediction models.

According to another general aspect of at least one embodiment, the determining from the one or more control point motion vectors that a first prediction model of the one or more prediction models is to be a translational prediction model, is based on the one or more control motion vectors being in inter mode.

According to another general aspect of at least one embodiment, the determining from the one or more control point motion vectors that a first prediction model of the one or more prediction models is to be a translational prediction model, is based on a relative motion between two of the one or more control point motion vectors being less than a value depending on a height and a weight of the current block.

According to another general aspect of at least one embodiment, the determining from the one or more control point motion vectors that a second prediction model of the one or more prediction models is to be an affine prediction model, is based on a relative motion between two of the one or more control point motion vectors being less than a value.

According to another general aspect of at least one embodiment, the affine prediction model is a 4-parameter affine prediction model.

According to another general aspect of at least one embodiment, the affine prediction model is a 6-parameter affine prediction model.

According to another general aspect of at least one embodiment, one or more syntax elements are included to indicate existence of the candidate list.

According to another general aspect of at least one embodiment, the one or more prediction models comprise an AMVP mode.

According to another general aspect of at least one embodiment, the one or more prediction models comprise a merge mode.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The general aspects described here are in the field of video compression. These aspects aim at improving compression efficiency compared to existing video compression systems.

In the HEVC video compression standard (H.265/HEVC High Efficiency Video Coding, ITU-T H.265 Telecommunication Standardization Sector of ITU, "Series H: Audiovisual and Multimedia Systems, Infrastructure of audiovisual services—Coding of moving video, High efficiency video coding."), motion compensated temporal prediction is employed to exploit the redundancy that exists between successive pictures of a video.

Figure 1:
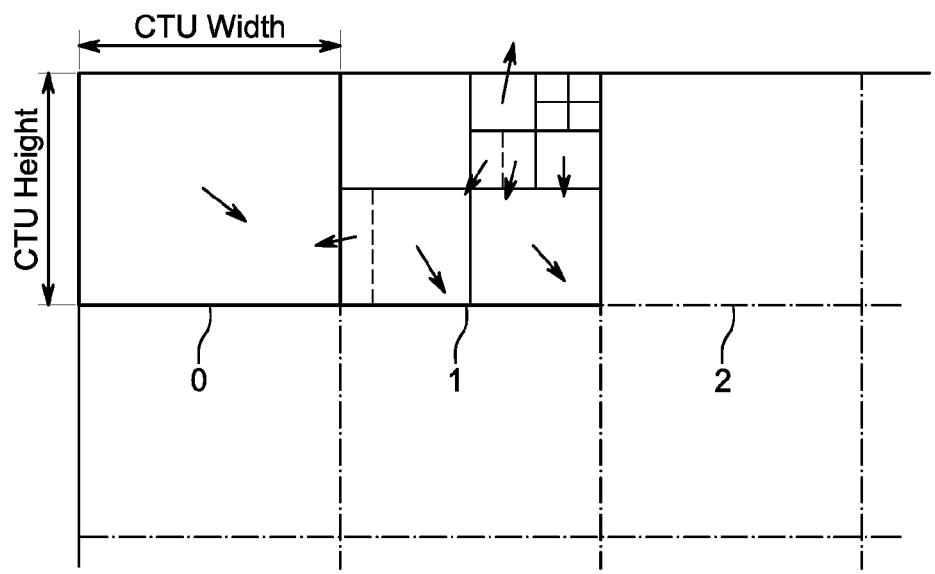
FIG. 1 shows a Coding Tree Unit and Coding Tree concepts to represent a compressed HEVC picture.

To do so, a motion vector is associated to each prediction unit (PU), which is introduced now. Each CTU (Coding Tree Unit) is represented by a Coding Tree in the compressed domain. This is a quad-tree division of the CTU, where each leaf is called a Coding Unit (CU), see FIG. 1.

Figure 2:
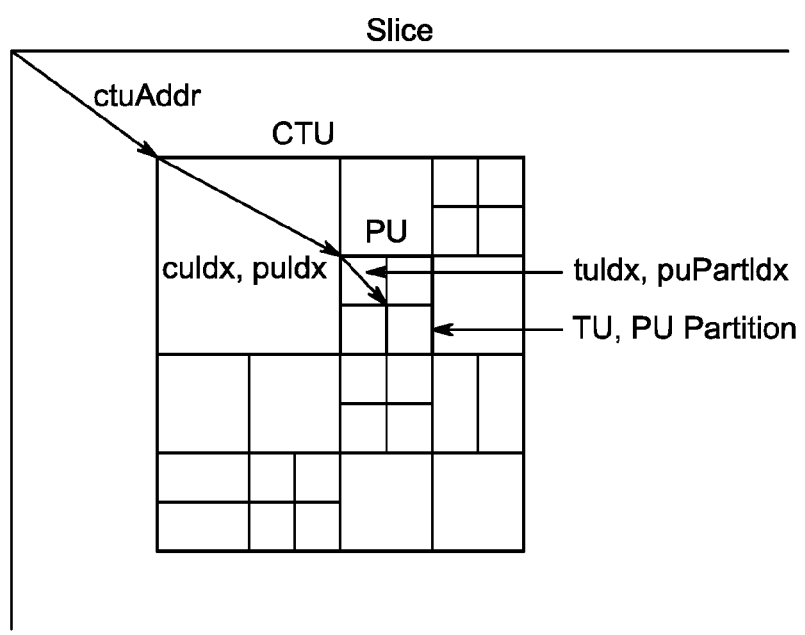
FIG. 2 shows division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level, see FIG. 2.

Exactly one Motion Vector is assigned to each PU in HEVC. This motion vector is used for motion compensated temporal prediction of the considered PU. Therefore, in HEVC, the motion model that links a predicted block and its reference block simply consists in a translation. This is therefore typically referred to as a translation or traditional motion prediction model.

In the Joint Exploration Model (JEM) and later VTM (Versatile Video Coding (WC) Test Model) developed by the JVET (Joint Video Exploration Team) group, some richer motion models are supported to improve temporal prediction. To do so, a PU can be spatially divided into sub-PU and a richer model can be used to assign each sub-PU a dedicated motion vector.

A CU is no longer divided into PU or TU, and some motion data is directly assigned to each CU. In this new codec design, a CU can be divided into sub-CU and a motion vector can be computed for each sub-CU.

One of the new motion models introduced in the JEM is the affine model, which basically consists in using an affine model to represent the motion vectors in a CU.

Figure 3:
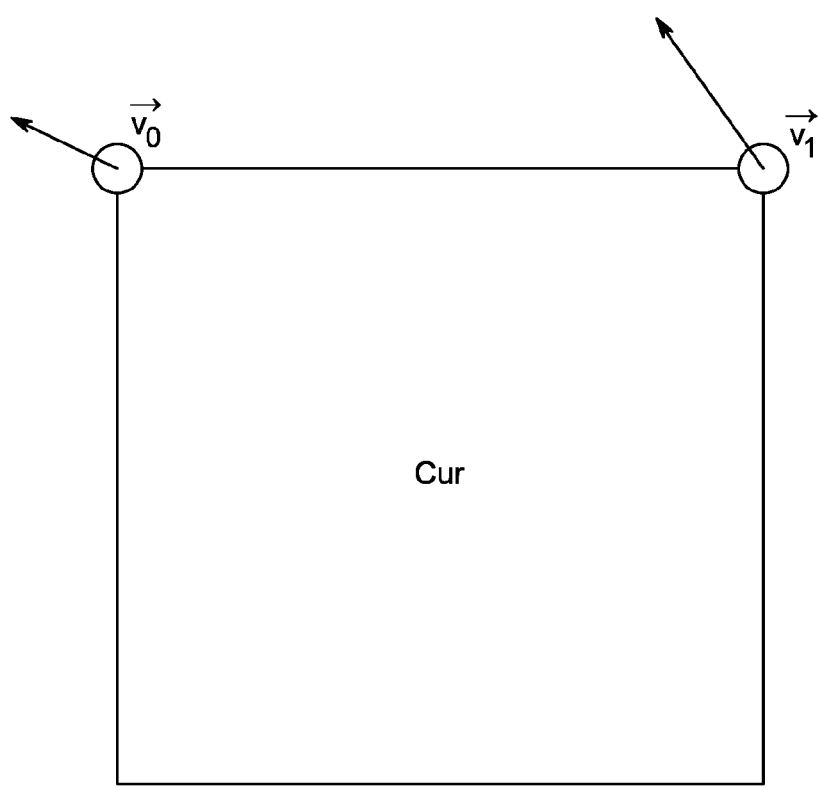
FIG. 3 shows a simple affine model used in the Joint Exploration Model.

The motion model used is illustrated by FIG. 3. The affine motion field consists in the following motion vector component values for each position (x,y) inside the considered block:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases}$$

Equation 1: Affine Model Used to Generate the Motion Field Inside a CU to Predict Motion Coordinates $(v_{0x}, v_{0y})$ and $(v_{1x}, v_{1y})$ are the so-called control point motion vectors used to generate the affine motion field. The point $(v_{0x}, v_{0y})$ is the motion vector top-left corner control point and $(v_{1x}, v_{1y})$ is the motion vector top-right corner control point.

Figure 4:
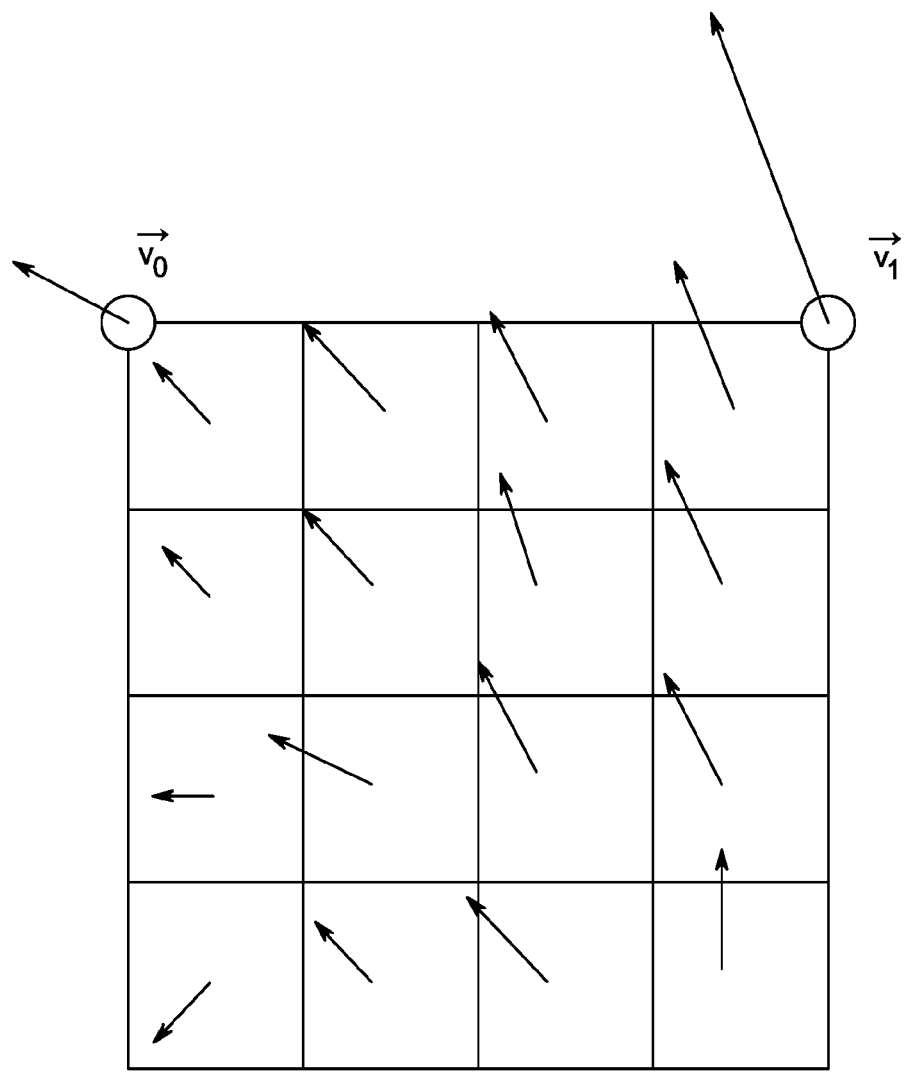
FIG. 4 shows a 4×4 sub-CU based affine motion vector field.

In practice, to keep complexity reasonable, a motion vector is computed for each 4×4 sub-block (sub-CU) of the considered CU, as illustrated on FIG. 4. An affine motion vector is computed from the control point motion vectors, at the position of the center of each sub-block. The obtained MV is represented at 1/16 pixel accuracy.

As a result, the temporal coding of a coding unit in the affine mode consists in motion compensated predicting each sub-block with its own motion vector.

Note that a model with three control points is also possible.

Affine motion compensation can be used in three ways in the JEM: Affine Inter (AF_INTER), Affine Merge and Affine Template. They are introduced in the following:

Affine Inter (AF_INTER).

Figure 5:
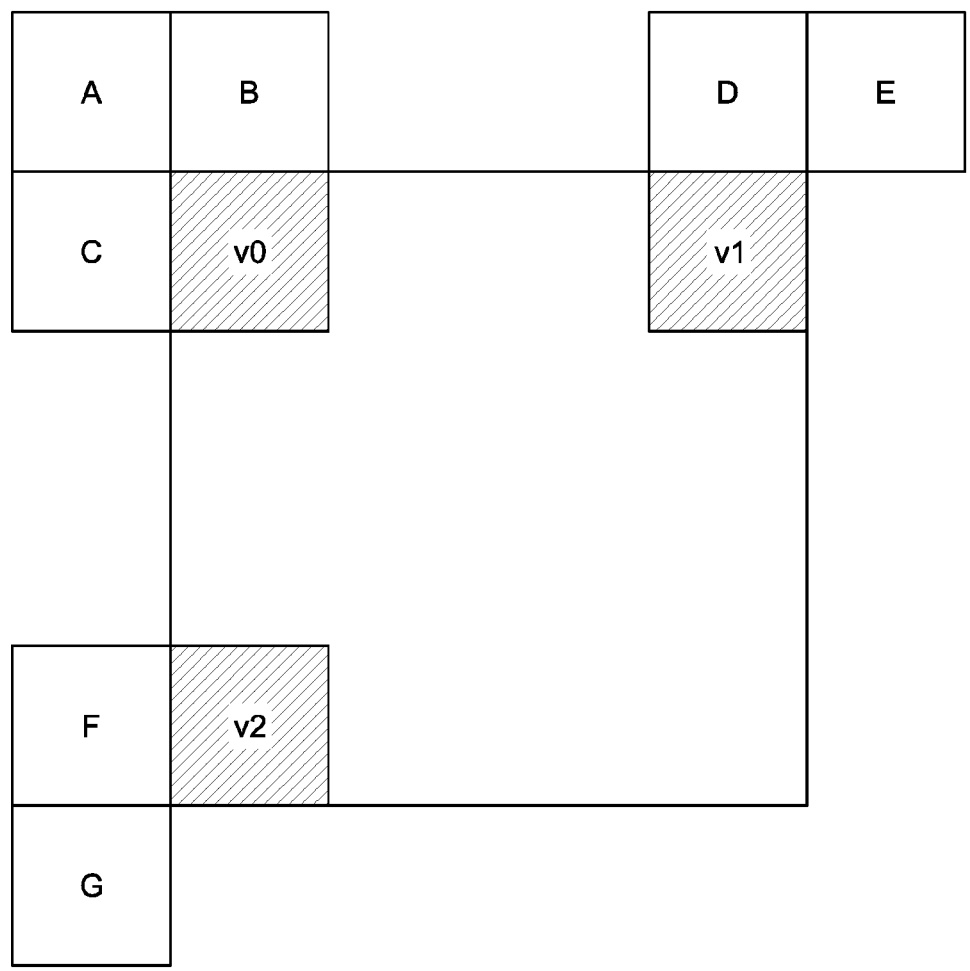
FIG. 5 shows the Motion vector prediction process for Affine Inter CUs.
Figure 6:
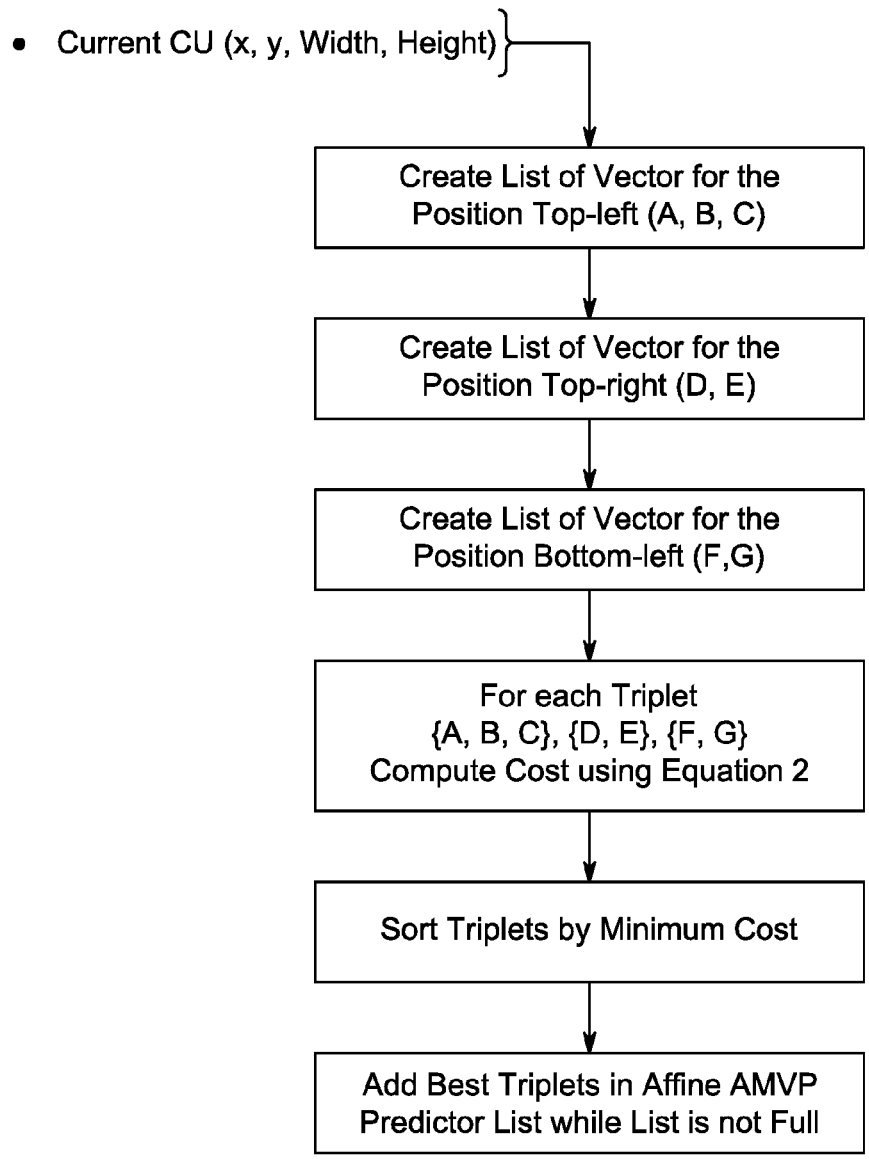
FIG. 6 shows the process for creating new candidates in affine AMVP process.

A CU in AMVP mode, having size larger than 8×8, can be predicted in Affine Inter mode. This is signaled through a flag in the bit-stream. The generation of the Affine Motion Field for that inter CU includes determining control point motion vectors (CPMV), which are obtained by the decoder through the addition of a motion vector difference and a control point motion vector prediction (CPMVP). The CPMVP is a pair of motion vector candidates, respectively taken from the list (A, B, C) and (D, E), as illustrated in FIG. 5.

Up to 6 CPMVP may be obtained (3 for $\vec{v_0}$ multiplied by 2 for $\vec{v_2}$).

First CPMVP are checked for validity using Equation 2, for a block of height H and Width W:

$$\overrightarrow{\Delta Hor} = \vec{v1} - \vec{v0}$$

$$DiffH = \frac{W}{2}$$

$$DiffV = \frac{H}{2}$$

validity =

$$\overrightarrow{\Delta Hor}! = \vec{0} \,\&\&\, \text{abs}(\overrightarrow{\Delta Hor} \cdot X) \leq DiffH \,\&\&\, \text{abs}(\overrightarrow{\Delta Hor} \cdot Y) \leq DiffV \,\&\&$$
$$\text{abs}(\overrightarrow{\Delta Ver} \cdot X) \leq DiffH \,\&\&\, \text{abs}(\overrightarrow{\Delta Ver} \cdot Y) \leq DiffV$$

Equation 2: Validity Test for Each CPMVP

Valid CPMVP are then sorted depending on the value of a third motion vector $\vec{v_2}$, (taken from position F or G). The closest $\vec{v_2}$ is to the vector given by the affine motion model for the 4×4 sub-block at the same position as $\vec{v_2}$, the better is the CPMVP.

For a block of Height H and Width W, the cost of each CPMVP is computed with Equation 3. In the following equation X and Y are respectively the horizontal and vertical components of a motion vector.

$$\overrightarrow{\Delta Hor} = \vec{v1} - \vec{v0}$$

$$\overrightarrow{\Delta Ver} = \vec{v2} - \vec{v0}$$

$$\text{cost} = \text{abs}(\overrightarrow{\Delta Hor}.X*H - \overrightarrow{\Delta Ver}.Y*W) + \text{abs}(\overrightarrow{\Delta Hor}.Y*H + \overrightarrow{\Delta Ver}.X*W)$$

Equation 3: Cost Computed for Each CPMVP

Affine Merge

Figure 7:
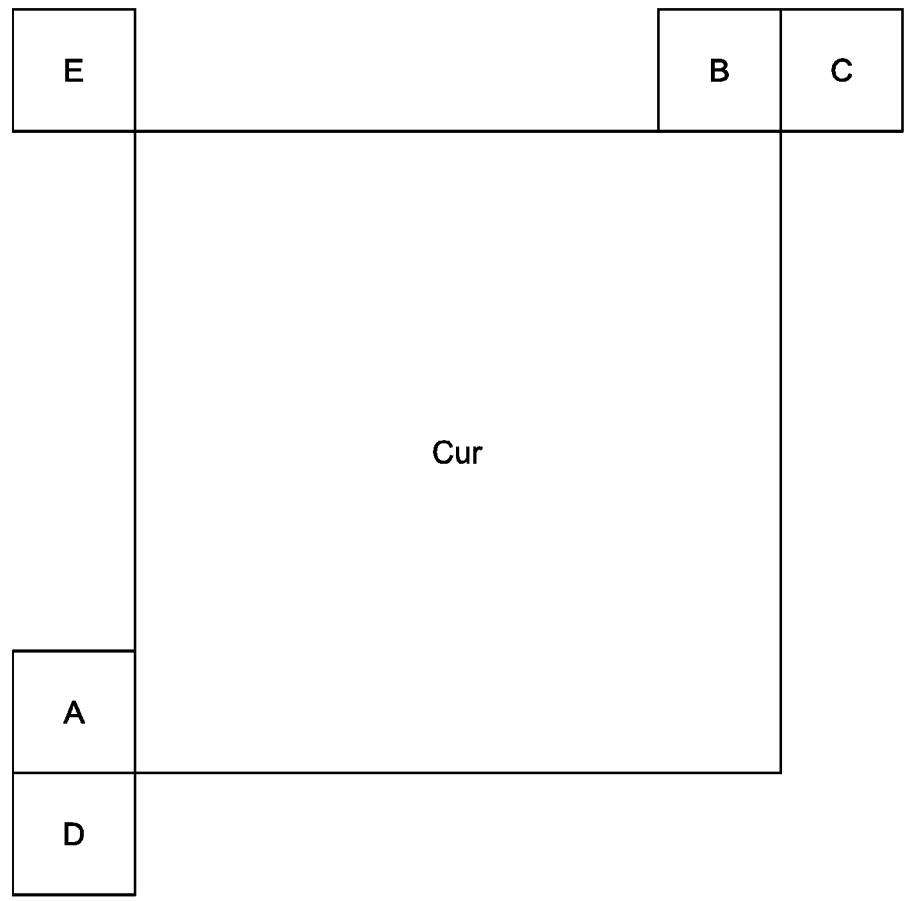
FIG. 7 shows the Motion vector prediction candidates in the Affine Merge mode.

In Affine Merge mode, a CU-level flag indicates if a merge CU employs affine motion compensation. If so, then the first available neighboring CU that has been coded in an Affine mode is selected among the ordered set of candidate positions (A, B, C, D, E) of FIG. 7.

Figure 8:
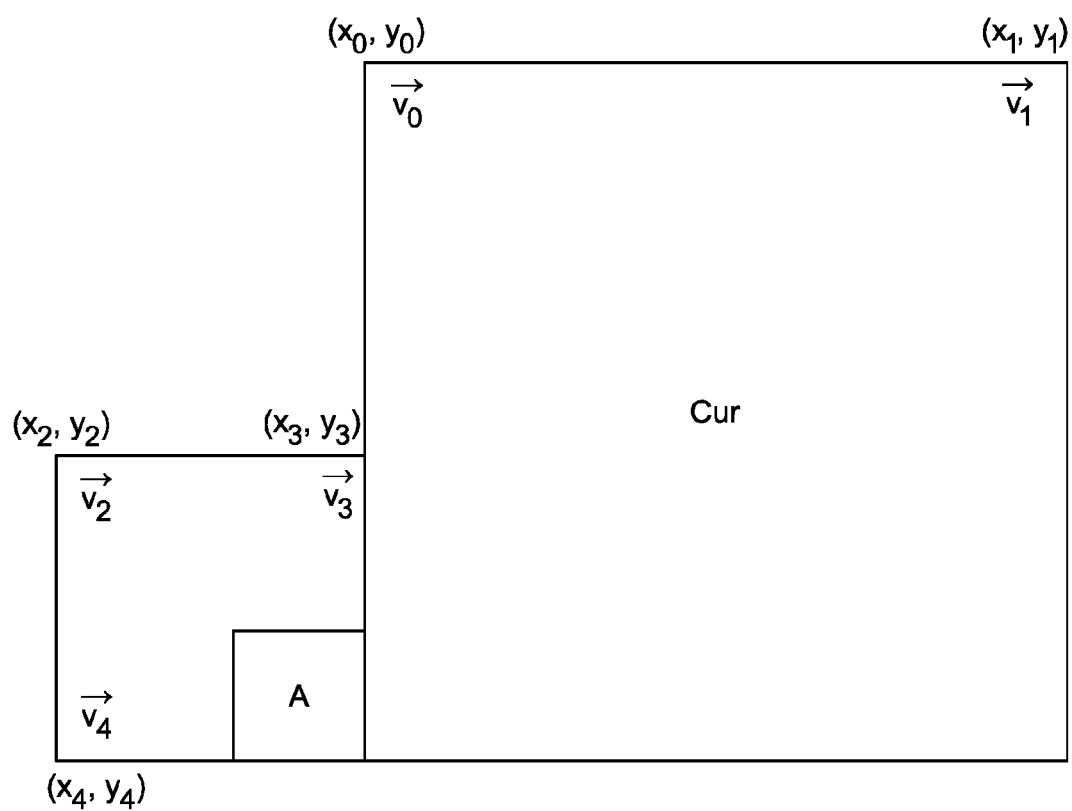
FIG. 8 shows the spatial derivation of affine motion field control points in the case of Affine Merge.

Once the first neighboring CU in Affine mode is obtained, then the 3 motion vectors $\vec{v_2}$, $\vec{v_3}$, and $\vec{v_4}$, from the top-left, top-right and bottom-left corners of the neighboring CU are retrieved (see FIG. 8). Based on these three vectors, the two CPMV of the top-left and top-right corners of current CU are derived as follows:

$$\vec{v_0} = \vec{v_2} + (\vec{v_4} - \vec{v_2})\left(\frac{Y_{curr} - Y_{neighb}}{H_{neighb}}\right) + (\vec{v_3} - \vec{v_2})\left(\frac{X_{curr} - X_{neighb}}{W_{neighb}}\right)$$

$$\vec{v_1} = \vec{v_0} + (\vec{v_3} - \vec{v_2})\left(\frac{W_{curr}}{W_{neighb}}\right)$$

Equation 4: Derivation of Current CU's CPMV Based on the Three Corner Motion Vectors of the Neighboring CU When the control point motion vectors $\vec{v_0}$ and $\vec{v_1}$ of a current CU are obtained, the motion field inside the current CU is computed on a 4×4 sub-CU basis, through the model of Equation 1.

In a prior work, more candidates are added for Affine merge mode, selecting the best candidate among a maximum of 7 candidates and coding the index of the best candidate in the bitstream.

Another type of candidate is called temporal affine:

Similar to TMVP (Temporal Motion Vector Predictor) candidates, affine CU are searched in reference images and added to the candidates list.

Figure 9:
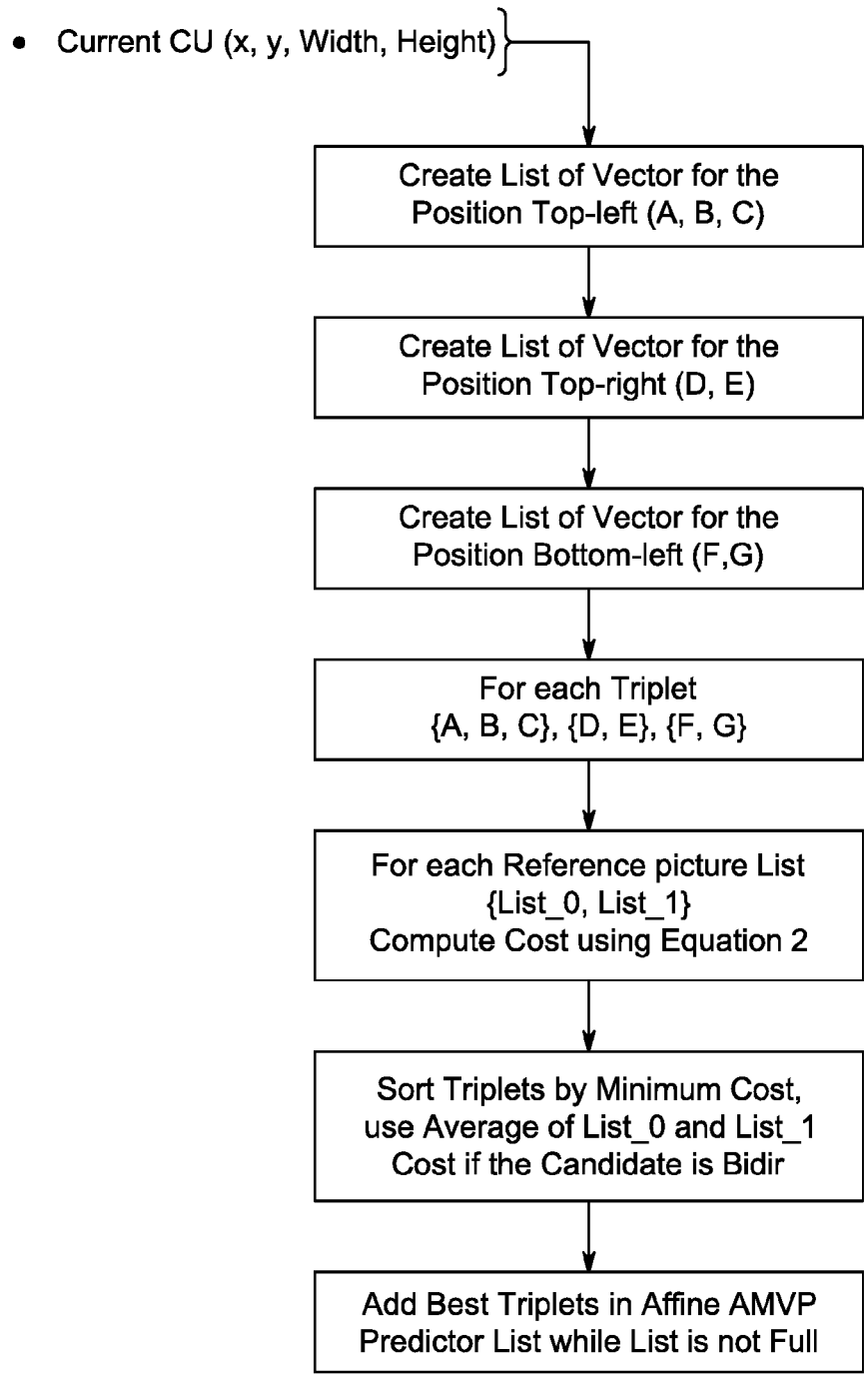
FIG. 9 shows an exemplary process to create new affine candidates.

In another work, a new process to create "virtual" candidates is added (see FIG. 9). The motivation is to create affine candidates when no affine CU are available around the current CU. To do so, an affine model is created by taking the motion of individual sub-blocks at the corner and creating an "affine" model.

Currently, candidates from affine motion model, either based on 4 parameters (model using 2 vectors) or 6 parameters (model using 3 vectors) and candidates from classical motion model, based on a translational model using a single vector, are considered separately in the codec:

For AMVP mode, the affine predictors are built separately from the classical AMVP predictors. In case of affine motion model, an affine flag is set to 1 to signal that 2 or more motion vector differences (mvd) will be read in the bistream. The list of predictors is different for traditional translational motion model and affine motion model.

For MERGE mode, the classical motion candidates and the affine motion candidates are built separately and an additional affine flag is set in the bitstream to signal the candidate list.

One issue, is that having separate candidates/predictors lists adds complexity to the design of the decoder. Moreover, some redundancy is introduced when affine and translational model are close which is not satisfying from memory bandwidth efficiency.

Another point is that, contrary to the translational candidates which are of one type, the affine candidates can be either constructed or inherited:

Inherited candidates require to save the affine model in each PU and then transform it as a model for the current PU.

Constructed model just requires the motion vector of each sub-block to be available, as in the traditional case, then an affine model is constructed from motion vectors of the neighboring sub-blocks.

The inherited case requires to store more data (the affine model of each PU), and hence more memory bandwidth to construct the candidates lists.

An encoding/decoding method or an apparatus that would reduce memory bandwidth while implementing affine motion model and translational motion model is therefore desirable.

At least one embodiment of the present principles relates to an encoding/decoding method comprising unifying or nesting the translational (i.e., traditional) and affine candidates in a single list in the codec by adding suitable criteria to decide if a candidate is translational or affine. In a variant of the at least one embodiment, the motion model (i.e., ether based on 3, 4, 5 or 6 parameters) is also determined from a similar suitable criteria.

Advantageously, since the encoding/decoding method comprising determining affine models, it eliminates the need for inherited model. Thus, memory bandwidth for storing inherited model can be reduced. Besides, the determined models are advantageously compatible with both spatial prediction (using current frame motion vector) and temporal prediction (using motion vector from a reference picture).

Figure 10:
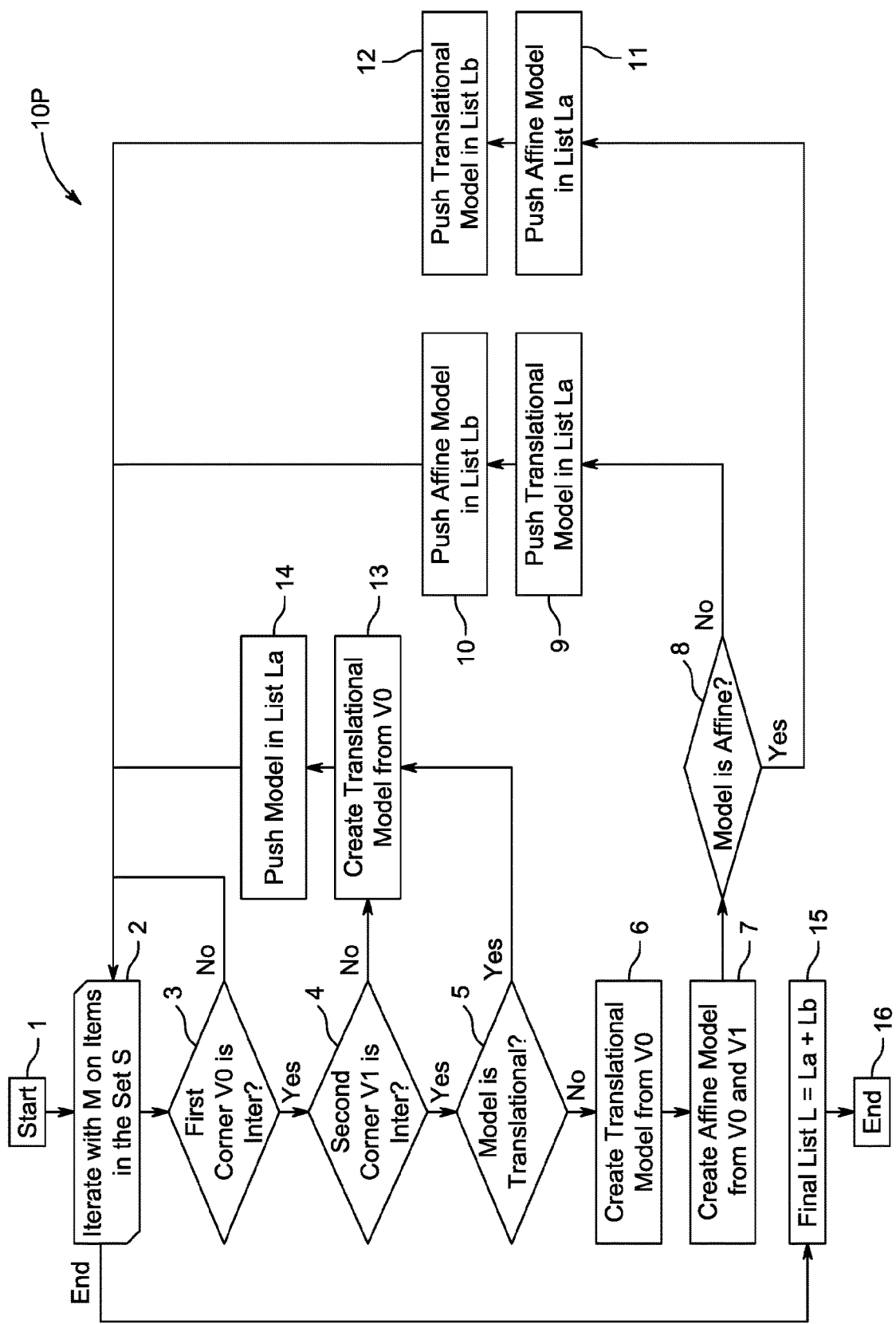
FIG. 10 shows an exemplary process to create a unified list of candidates including affine candidates and translational candidates.

As shown in FIG. 10, At least one embodiment is now described related to an overall process 10P to create a unified or nested list of potential candidates (15), either for AMVP (then used as a predictor) or MERGE mode. The process of choosing the reference picture and the associated motion vector rescaling process is not described here, but a usual process can be used such as, for instance, known by a skilled person in the art from HEVC.

Exemplary Embodiments—4 Parameters Affine Model

As shown in process 10P of FIG. 10, for each item in the set S, corners V0, V1 of a respective reference block (as represented in FIG. 5) are examined in order (1-14). Two sub-lists La and Lb are temporary created to respectively stored the motion model candidates sorted on their likelihood: most likely candidates are added in La and the other one in Lb (e.g., 9-12 and 14). As shown in process 10P of FIG. 10, if only a translational model can be built ("yes" branch of 5), it is put in the list La (13, 14). If a translational model (using the first corner, 3) and an affine model (using several corners, 3 and 4) can be built (6-8), they are push in list La for the likely best model (11, when decision 8 is "yes"), and Lb for the other one (12). In order to decide the best model, the test "Model is affine?" (8) processes the model validity as explained in an exemplary process 11P shown in FIG. 11 and explained below. The test "model is translational?" (5) follows a process 12P shown in FIG. 12 and further described below.

The affine model creation itself is not described herewith for brevity. It may, for example, follow the process explained in the latest standard development of WC as already well known in the art.

For illustration, one example of set S (2 of FIG. 10) may be as follows, using the vector and reference block notation in FIG. 5:

{{A,E}, {G, A}, {D, B}, {F, C}, {At,Et}, {Gt, At}, {Dt, Bt}, {Ft, Ct} }

In this exemplary set, corners denoted by t are temporal candidates (as opposed to spatial). Applying this example to the exemplary process 10P in FIG. 10, the first item examined is {A, E}. In this case, first corner V0=A and second corner V1=E in FIG. 10. First, the prediction mode of V0=A is tested to determine whether the mode is inter or not (3). In case, the mode of A is not inter ("no" branch of 3), another item in the set is tested (2). In case the prediction mode of A is inter ("yes" branch of 3), the prediction mode of V1=E is tested to determine whether the model is inter or not (4). In the case when the mode of E is not inter ("no" branch of 4), then a translational model is created from V0=A being inter (13) and push in the sub-list La (14). In the case when the mode of E is also inter ("yes" branch of 4), then a test "model is translational?" is applied (5).

The test "model is translational?" (5) in the exemplary process 10P in FIG. 10 is described hereinafter. The test is based on criteria that the relative motion amplitudes of the corners V0 and V1, 2 metrics representing the horizontal and vertical difference between the respective corner's motion vector, are computed and compared to a value p. In case the 2 metrics are below the value p, the model is determined as translational. In that case, a translational model is created from V0=A (13 of FIG. 10) and push in the sub-list La (14 of FIG. 10).

In the other case, both translational model from V0 and affine model from V0 and V1 are determined and the affine model is tested with the "model is affine?"(8) as described hereinafter. 4 metrics representing the horizontal and vertical difference between the respective corner's motion vectors of V0 with regard to V1, and V0 with regard to V2. In case the 4 metrics are below another value k relatively to width w and high h of the current block, the model is determined as affine ("yes" branch of 8). In that case, the affine model is pushed in the sub-list La (11), and the translational model is push in the sub-list Lb (12). In case the determined model is not affine ("no" branch of 8), the translational model, more likely, is pushed in the sub-list La (9), and the affine model is push in the sub-list Lb (10).

Process 10P is iterated for each item in the list (2), either spatial candidates or temporal candidates. The model of V0 is tested to check whether the model is affine.

Thus, based on a criteria representative of the relative motion amplitude at corner of the current block, the method determines that a candidate is affine or translational and generate the associated model. According to a characteristic, in case the criteria are below or equal to a first value (p) the model is translational, in case the criteria are between the first value (p) and a second value (k*w or k*h), the model is affine and in case the criteria are above the second value (k*w or k*h), the model is translational. Advantageously, the proposed criteria allow to remove affine model that are too close to a translational model while removing models that are not reliable due to motion discrepancy.

Of course, the present embodiment is not limited to the described order of the items, corners used to form a model, number of items. However, as the sequence of first corners in the list (in the example A, G, D, F) gives a list of unique candidates for the translational model, the present implementation advantageously allows that a variety of translational models based on either motion from A, G, D, F are added to the candidate list.

At the end, list La and Lb are concatenated in this order (15). The unicity of each candidate in the list is checked in each list before putting it in a list. Thus, unlike other approach presented in JVET where translational and affine candidates were added in a single ordered list for merge mode (namely affine and translational vector are set in the list according to a predetermined order), the present embodiment not only unifies the candidates list, but orders the translational and affine candidates according to likelihood based on a cost criteria representative of the relative motion amplitude at corner of the current block.

Advantageously, the proposed method reduces memory bandwidth for storing and managing motion vector predictors and candidates for both classical and affine motion model compensation.

Figure 11:
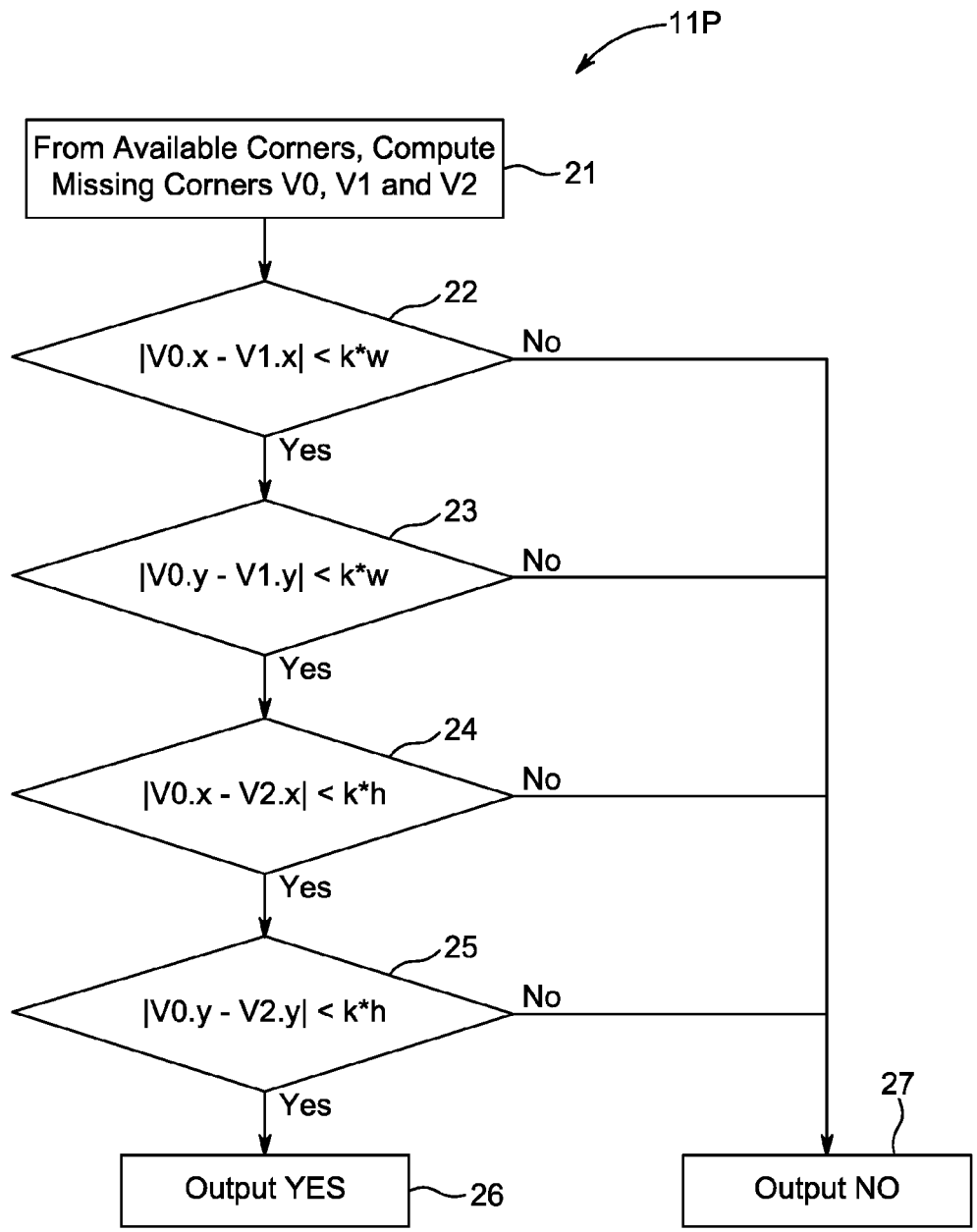
FIG. 11 shows an exemplary affine model decision process.

FIG. 11 illustrates the principles of an exemplary process 11P to test whether an affine model is to be chosen. In FIG. 11, a model is assumed affine if the relative motion between corners is less than some value depending on the block size h and w. The validation process 11P first checks that the affine model does not induce large motion difference between all corners (21-25). In the test, V0, V1 and V2 denotes the corners as shown in FIG. 10. A.x and A.y denote the motion vector on x and y axis respectively. The values h and w denote the PU height and width, and k is a fixed constant (for example, k=8 for high precision motion vector with $\frac{1}{16}^{th}$ pixel accuracy).

Figure 12:
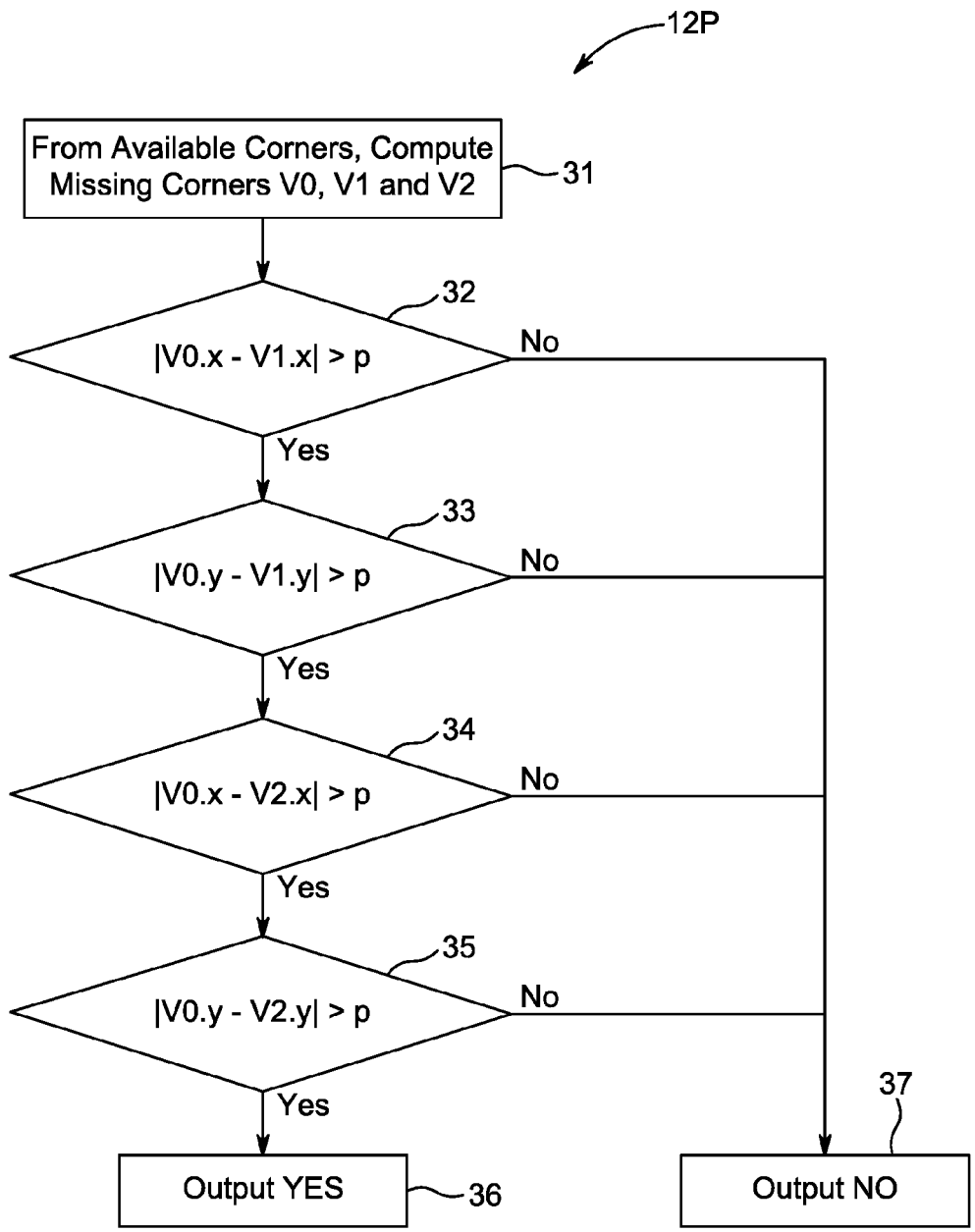
FIG. 12 shows an exemplary process to decide if a model is translational.

FIG. 12 illustrates the principles of an exemplary process 12P for determining whether a model is translational or not. A model is considered as pure translational if the relative motion of at least 2 corners is below a value (31-35). A typical value for p is 0. The illustrated embodiment uses the motion vector at 3 corners: V0, V1 and V2. As shown below, motion vector for V2 natively exists with a 6 parameters model. However, it does not exist for 4 parameters model. Thus, according to a first variant, V2 (or any other corner) is first computed according to the affine model (equation 1) and used in the above described process 12P. According to a second variant, the test with V2 are skipped, thus the determining whether a model is translational or not is only responsive to V0 and V1 (32, 33). The second variant (32-35) is further compatible with the 6 parameters model.

Exemplary Embodiments—6 Parameters Affine Model

Figure 13:
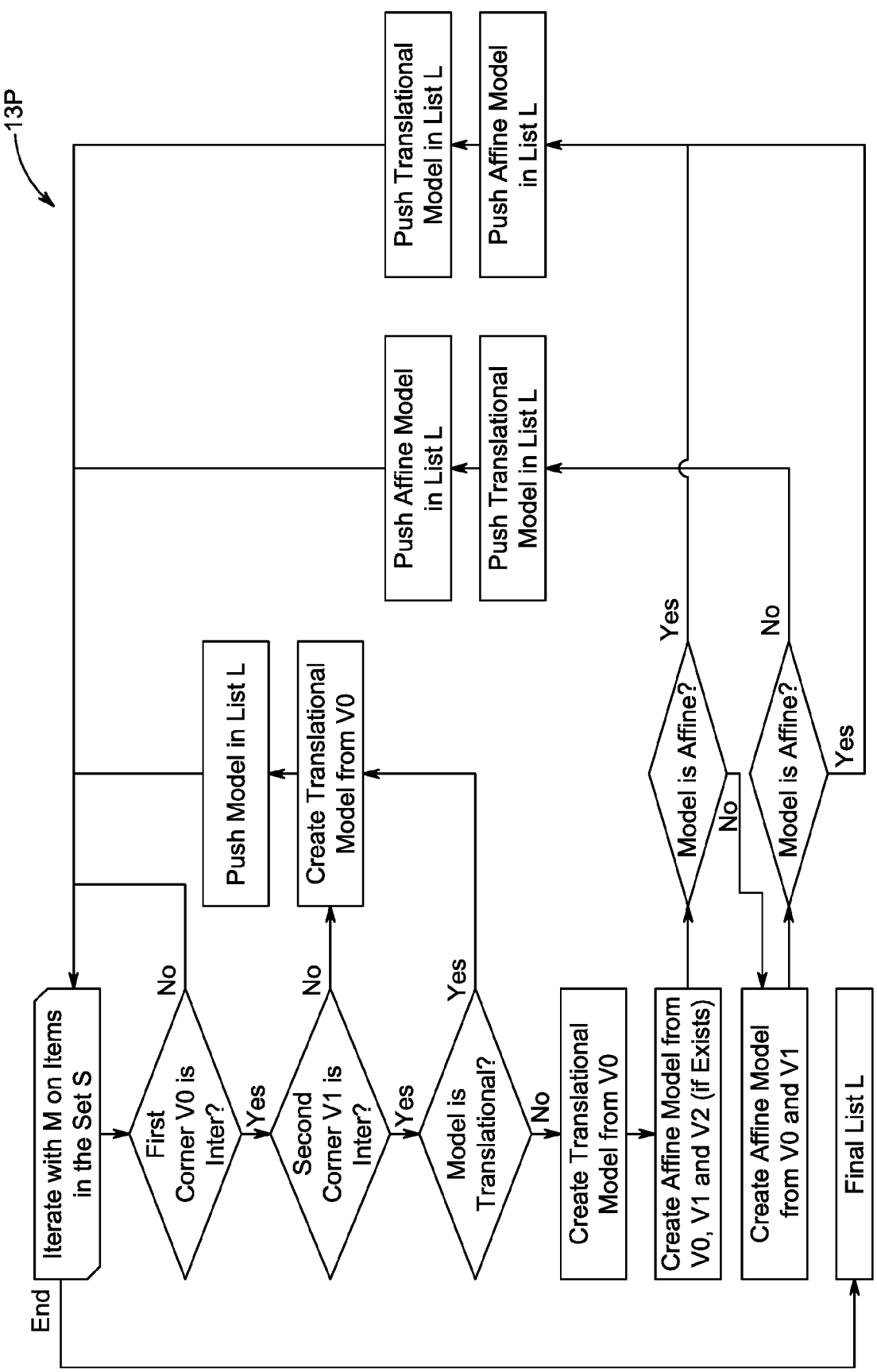
FIG. 13 shows an exemplary process to create a unified list of candidates with a 6-parameter affine model and translational model.

FIG. 13 illustrates the principles of an exemplary process 13P using 6 parameters affine model. For a 6 parameters affine model, the overall process is similar to 4 parameters model process 11P shown in FIG. 11 and described before. First, the 6 parameters model is examined. If it is not affine, then the 4 parameters is examined. A typical set for S for a 6 parameters model is:

{{A, E, G}, {F, C, D}, {D, B, F}, {A, E, G}t, {F, C, D}t, {D, B, F}t}.

Exemplary Embodiments—Variants of List Concatenation

In other non-limiting aspects of the present principles, instead of concatenating all elements of list Lb after all elements of list La as shown in FIG. 10 or FIG. 13, the elements of list La and Lb can be interlaced during the separate list creation process.

Exemplary Embodiments—Inherited Models

According to another variant, the inherited models are used, the construction of the model is replaced by the transfer of the model on the current PU and the test "model is affine?" by the existence of an affine model or not.

The present application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 14:
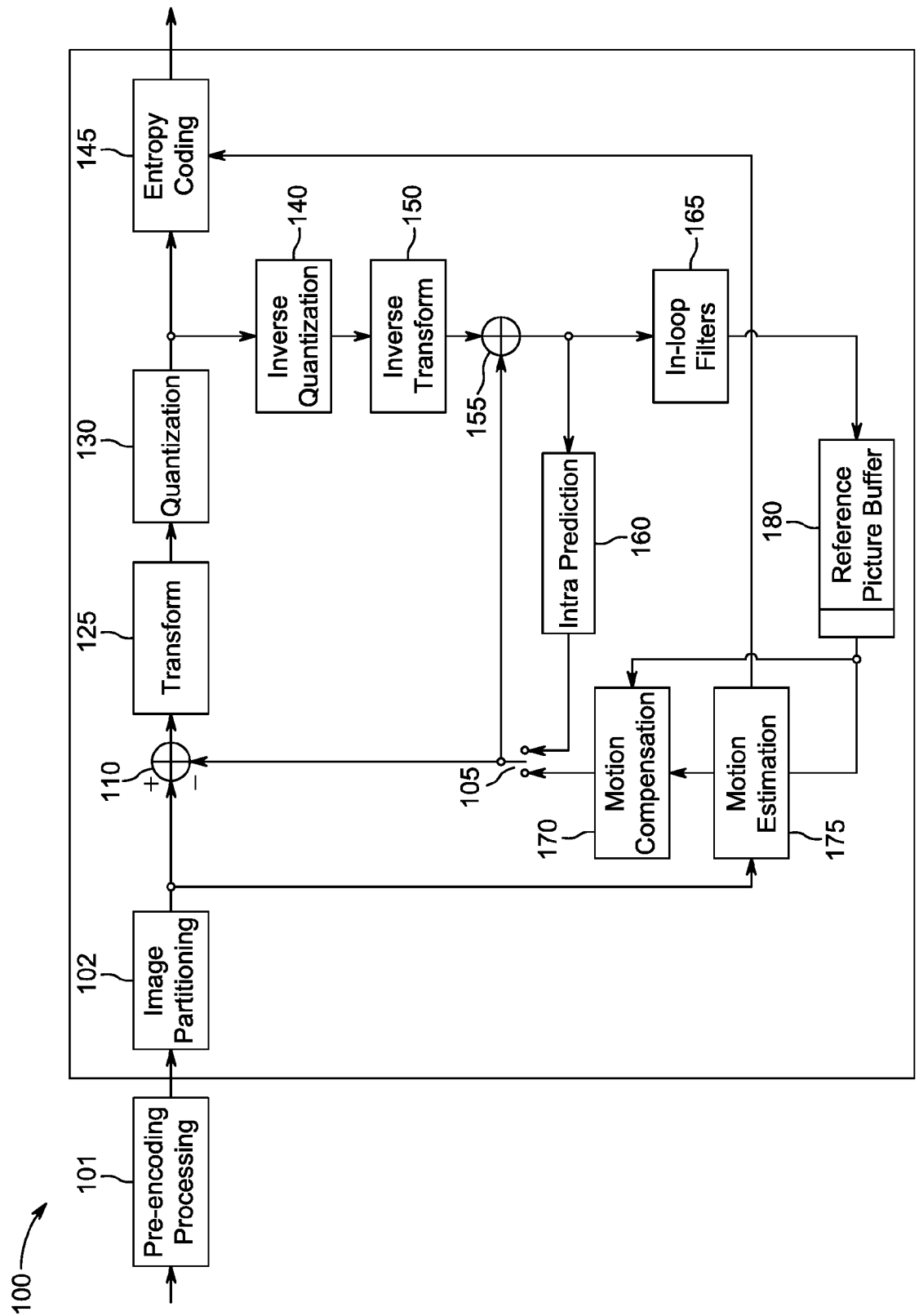
FIG. 14 shows a block diagram of an embodiment of a video encoder.
Figure 15:
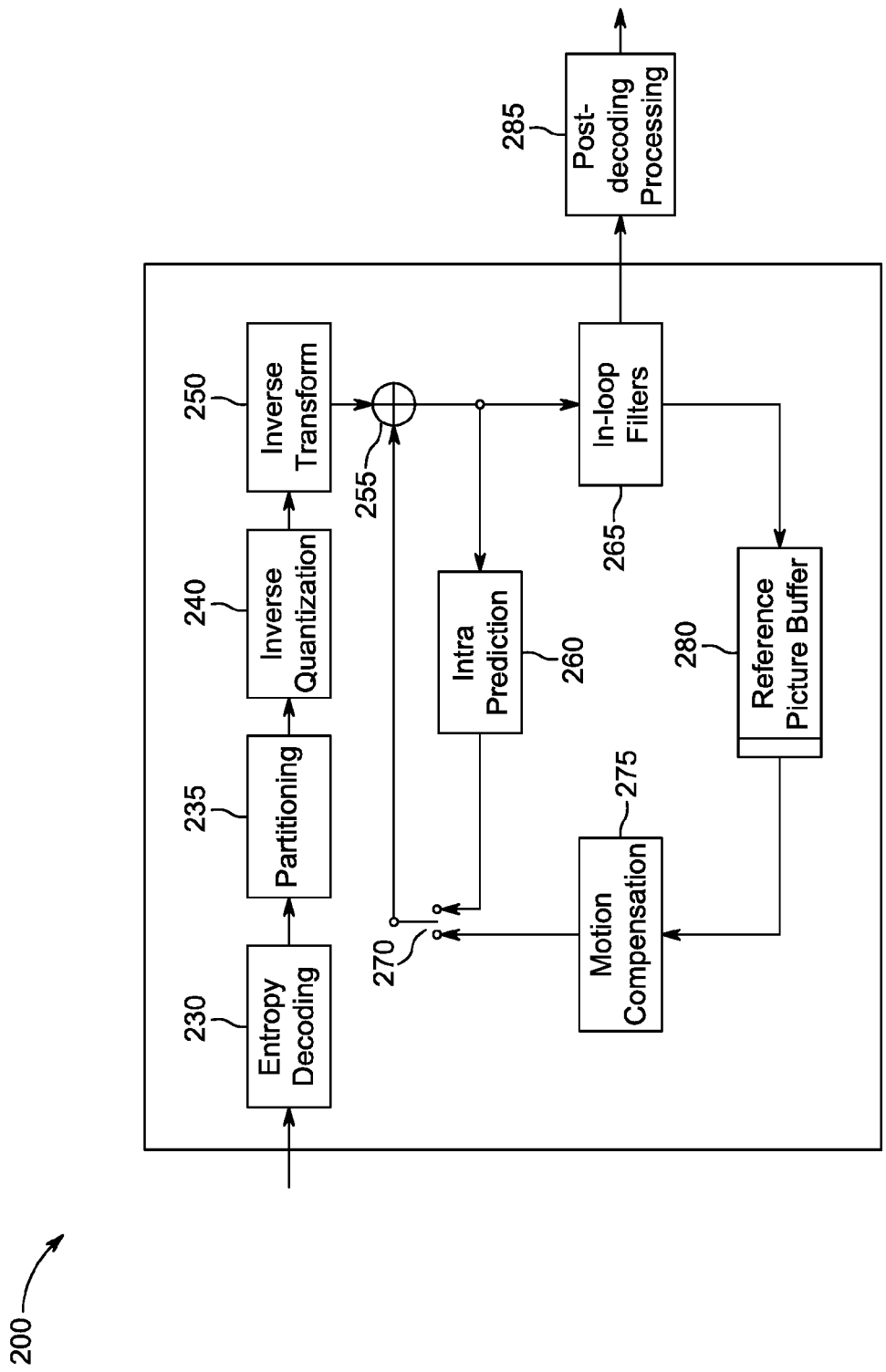
FIG. 15 shows a block diagram of an embodiment of a video decoder.
Figure 16:
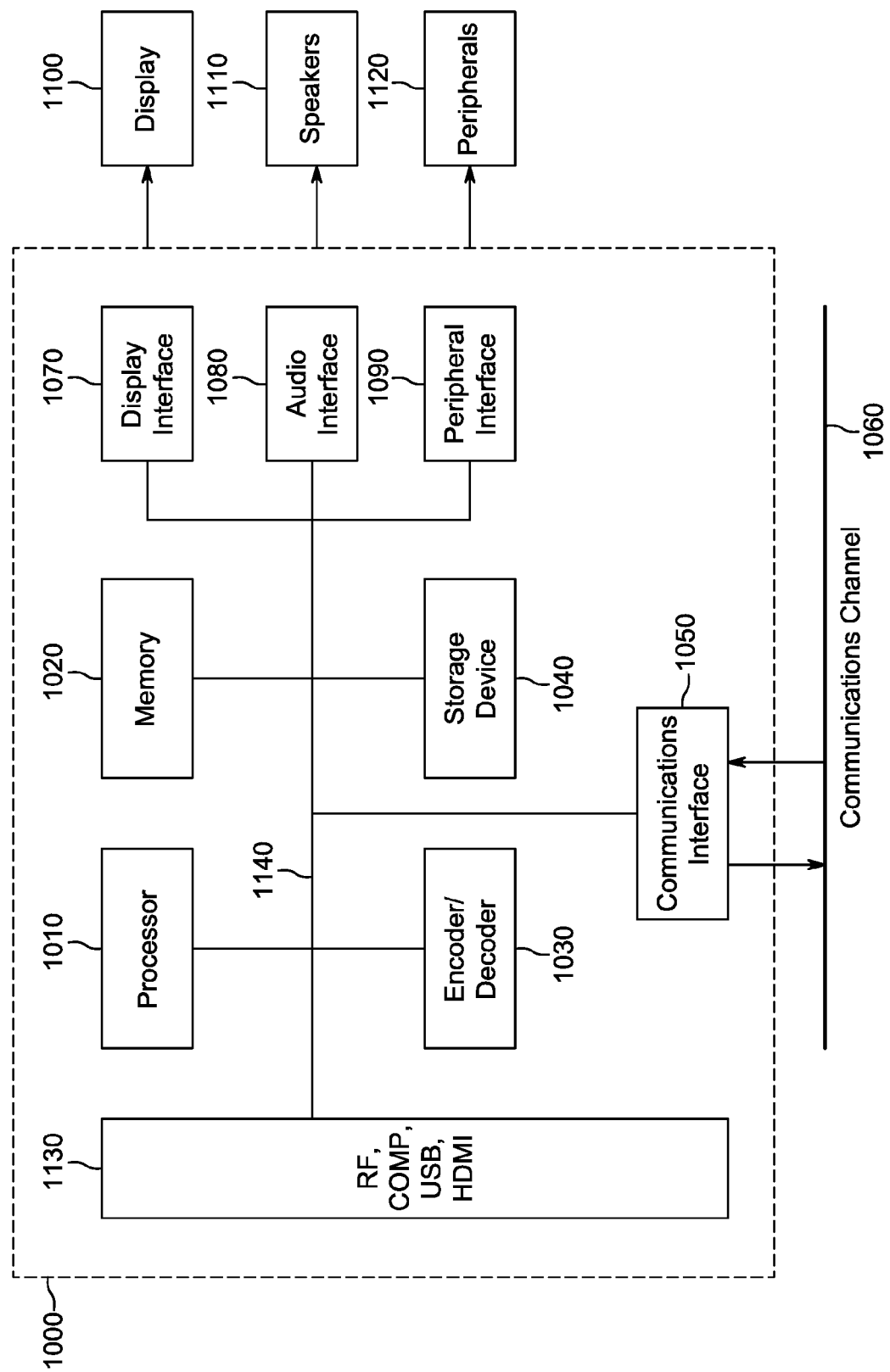
FIG. 16 shows a block diagram of a system within which aspects of the present embodiments may be implemented.

The aspects described and contemplated in this document can be implemented in many different forms. FIGS. 14, 15, and 16 below provide some embodiments, but other embodiments are contemplated and the discussion of FIGS. 14, 15, and 16 do not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present document. The specific values are for example purposes and the aspects described are not limited to these specific values.

FIG. 14 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 15 illustrates a block diagram of a video decoder 200. In the decoder 200, a bitstream is decoded by the decoder elements as described below. Video decoder 200 generally performs a decoding pass reciprocal to the encoding pass as described in FIG. 20. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g., conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or WC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the 12C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B)

only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the following features, devices, or aspects, alone or in any combination, across various claim categories and types:

Storing predictors/candidates for motion model used motion compensation process in a single unified list applied in the decoder and/or encoder.

Determining/constructing a motion model for a block independently of the affine or translational mode in the motion compensation methods in the decoder and/or encoder.

Inserting in the signaling syntax elements that enable the decoder to identify the motion model and/or motion compensation method to use.

Inserting in the signaling syntax elements that enable the decoder to identify the motion model only in AMVP mode and skipping the signaling in merge mode.

Determining a motion candidate/predictor for a current block comprising at least a motion vector and a translational or affine model, such determining is based on a criteria representative of the relative motion amplitude at corner of the current block, Selecting, based on a syntax, the motion model method to apply at the decoder.

A bitstream or signal that includes one or more of the described syntax elements, or variations thereof.

Inserting in the signaling syntax elements that enable the decoder to determine motion compensation in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs motion compensation in encoding/decoding according to any of the embodiments described.

A TV, set-top box, cell phone, tablet, or other electronic device that performs motion compensation in encoding/decoding according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs motion compensation in encoding/decoding according to any of the embodiments described.

A TV, set-top box, cell phone, tablet, or other electronic device that receives (e.g. using an antenna) a signal over the air that includes an encoded image, and performs motion compensation in encoding/decoding according to any of the embodiments described.

Various other generalized, as well as particularized, aspects, embodiments and claims are also supported and contemplated throughout this disclosure. For example, various methods and other aspects described in this application can be used to modify modules, for example, motion compensation and estimation modules (170, 175; and 275), of a video encoder 100 and decoder 200 as shown respectively in FIG. 14 and FIG. 15. Moreover, the present aspects are not limited to WC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

The invention claimed is:

1. A method for video decoding, comprising:
determining one or more prediction models respectively for one or more prediction candidates used for the video decoding based on one or more control point motion vectors of a current block of the video being decoded;
determining from the one or more control point motion vectors that a first prediction model of the one or more prediction models is to be a translational prediction model, wherein the first prediction model of a prediction candidate is a translational prediction model when a relative motion between two of the one or more control point motion vectors is less than or equal to a first value or higher than a second value depending on a height and a width of the current block;

determining from the one or more control point motion vectors that a second prediction model of the one or more prediction models is to be an affine prediction model; and decoding the video based on a candidate list comprising the one or more prediction candidates determined respectively from the one or more prediction models.

2. The method of claim 1, wherein the determining from the one or more control point motion vectors that a first prediction model of the one or more prediction models is to be a translational prediction model, is based on the one or more control motion vectors being in inter mode.

3. The method of claim 1, wherein the second prediction model of the one or more prediction models is to be an affine prediction model when a relative motion between two of the one or more control point motion vectors is higher than the first value and lower than or equal to the second value depending on a height and a width of the current block.

4. The method of claim 1, wherein the affine prediction model is a 4-parameter affine prediction model or a 6-parameter affine prediction model.

5. The method of claim 1, wherein the one or more prediction models comprise an AMVP mode or a merge mode.

6. An apparatus for video decoding, comprising one or more processors, wherein the one or more processors are configured to:
determine one or more prediction models respectively for one or more prediction candidates used for the video decoding based on one or more control point motion vectors of a current block of the video being decoded;
determine from the one or more control point motion vectors that a first prediction model of the one or more prediction models is to be a translational prediction model, wherein the first prediction model of a prediction candidate is a translational prediction model when a relative motion between two of the one or more control point motion vectors is less than or equal to a first value or higher than a second value depending on a height and a width of the current block;
determine from the one or more control point motion vectors that a second prediction model of the one or more prediction models is to be an affine prediction model; and
decode the video based on a candidate list comprising the one or more prediction candidates determined respectively from the one or more prediction models.

7. The apparatus of claim 6, wherein the determining from the one or more control point motion vectors that a first prediction model of the one or more prediction models is to be a translational prediction model, is based on the one or more control motion vectors being in inter mode.

8. The apparatus of claim 6, wherein the second prediction model of the one or more prediction models is to be an affine prediction model when a relative motion between two of the one or more control point motion vectors is higher than the first value and lower than or equal to the second value depending on a height and a width of the current block.

9. The apparatus of claim 6, wherein the affine prediction model is a 4-parameter affine prediction model or a 6-parameter affine prediction model.

10. The apparatus of claim 6, wherein the one or more prediction models comprise an AMVP mode or a merge mode.

11. A method for video encoding, comprising:
determining one or more prediction models respectively for one or more prediction candidates used for the video encoding based on one or more control point motion vectors of a current block of the video being encoded;
determining from the one or more control point motion vectors that a first prediction model of the one or more prediction models is to be a translational prediction model, wherein the first prediction model of a prediction candidate is a translational prediction model when a relative motion between two of the one or more control point motion vectors is less than or equal to a first value or higher than a second value depending on a height and a width of the current block;
determining from the one or more control point motion vectors that a second prediction model of the one or more prediction models is to be an affine prediction model; and
encoding the video based on a candidate list comprising the one or more prediction candidates determined respectively from the one or more prediction models.

12. The method of claim 11, wherein the determining from the one or more control point motion vectors that a first prediction model of the one or more prediction models is to be a translational prediction model, is based on the one or more control motion vectors being in inter mode.

13. The method of claim 11, wherein the second prediction model of the one or more prediction models is to be an affine prediction model when a relative motion between two of the one or more control point motion vectors is higher than the first value and lower than or equal to the second value depending on a height and a width of the current block.

14. The method of claim 11, wherein the affine prediction model is a 4-parameter affine prediction model or a 6-parameter affine prediction model.

15. The method of claim 11, wherein the one or more prediction models comprise an AMVP mode or a merge mode.

16. An apparatus for video encoding, comprising one or more processors, wherein the one or more processors are configured to:
determine one or more prediction models respectively for one or more prediction candidates used for the video encoding based on one or more control point motion vectors of a current block of the video being encoded;
determine from the one or more control point motion vectors that a first prediction model of the one or more prediction models is to be a translational prediction model, wherein the first prediction model of a prediction candidate is a translational prediction model when a relative motion between two of the one or more control point motion vectors is less than or equal to a first value or higher than a second value depending on a height and a width of the current block;
determine from the one or more control point motion vectors that a second prediction model of the one or more prediction models is to be an affine prediction model; and
encode the video based on a candidate list comprising the one or more prediction candidates determined respectively from the one or more prediction models.

17. The apparatus of claim 16, wherein the determining from the one or more control point motion vectors that a first prediction model of the one or more prediction models is to be a translational prediction model, is based on the one or more control motion vectors being in inter mode.

18. The apparatus of claim 16, wherein the second prediction model of the one or more prediction models is to be an affine prediction model when a relative motion between two of the one or more control point motion vectors is higher than the first value and lower than or equal to the second value depending on a height and a width of the current block.

19. The apparatus of claim 16, wherein the affine prediction model is a 4-parameter affine prediction model or a 6-parameter affine prediction model.

20. The apparatus of claim 16, wherein the one or more prediction models comprise an AMVP mode or a merge mode.

* * * * *